United States Patent [19]

Crawford et al.

[11] Patent Number: 5,255,378
[45] Date of Patent: Oct. 19, 1993

[54] METHOD OF TRANSFERRING BURST DATA IN A MICROPROCESSOR

[75] Inventors: John H. Crawford, Santa Clara; Edward T. Grochowski, San Jose, both of Calif.

[73] Assignee: Intel Corporation, Santa Clara, Calif.

[21] Appl. No.: 981,943

[22] Filed: Nov. 24, 1992

Related U.S. Application Data

[63] Continuation of Ser. No. 861,602, Apr. 1, 1992, abandoned, which is a continuation of Ser. No. 333,980, Apr. 5, 1989, Pat. No. 5,131,083.

[51] Int. Cl.$^5$ ............................................. G06F 13/28
[52] U.S. Cl. .................................... 395/325; 395/275; 395/425; 364/251; 364/DIG. 1; 364/960; 364/DIG. 2
[58] Field of Search .............. 395/325, 275, 425; 400; 364/251, DIG. 1, 960, DIG. 2

[56] References Cited

U.S. PATENT DOCUMENTS

| | | | |
|---|---|---|---|
| 3,961,312 | 6/1976 | Bodues et al. | 364/200 |
| 4,315,308 | 2/1982 | Jackson | 364/200 |
| 4,366,539 | 12/1982 | Johnson et al. | 364/200 |
| 4,370,712 | 1/1983 | Johnson et al. | 395/425 |
| 4,442,484 | 4/1984 | Childs, Jr. et al. | 364/200 |
| 4,447,878 | 5/1984 | Kinnie et al. | 364/200 |
| 4,570,220 | 2/1986 | Tetrick et al. | 364/200 |
| 4,638,451 | 1/1987 | Hester et al. | 395/275 |
| 4,649,463 | 2/1987 | Hotchkin et al. | 395/250 |
| 4,807,109 | 2/1989 | Farrell et al. | 364/200 |
| 4,809,156 | 2/1989 | Taber | 395/400 |
| 4,912,630 | 3/1990 | Cochcroft, Jr. | 395/425 |
| 5,014,188 | 5/1991 | Kawamura | 395/425 |
| 5,131,083 | 7/1992 | Crawford et al. | 395/275 |
| 5,185,694 | 2/1993 | Edenfield et al. | 395/425 |

FOREIGN PATENT DOCUMENTS

0115097A1 of 0000 European Pat. Off. .
WO/81006-33A1 of 0000 World Int. Prop. O. .

Primary Examiner—Michael R. Fleming
Assistant Examiner—Glenn A. Auve
Attorney, Agent, or Firm—Blakely, Sokoloff, Taylor & Zafman

[57] ABSTRACT

An improved method of transferring burst data in a microprocessor is described. The improvement lies in the burst ordering of the data items to be referenced. The original address is selected as the data item that the user initially wants to access. Subsequent addresses in the burst are generated according to a mathematical algorithm. The algorithm generates the remaining addresses as a function of the internal bus width, the external memory/bus line size and the original address. Using the burst sequence of the present invention, memories/buses of different widths can be smoothly coupled to a microprocessor having a fixed CPU bus size (e.g., 32 bits).

10 Claims, 5 Drawing Sheets

FIG_1

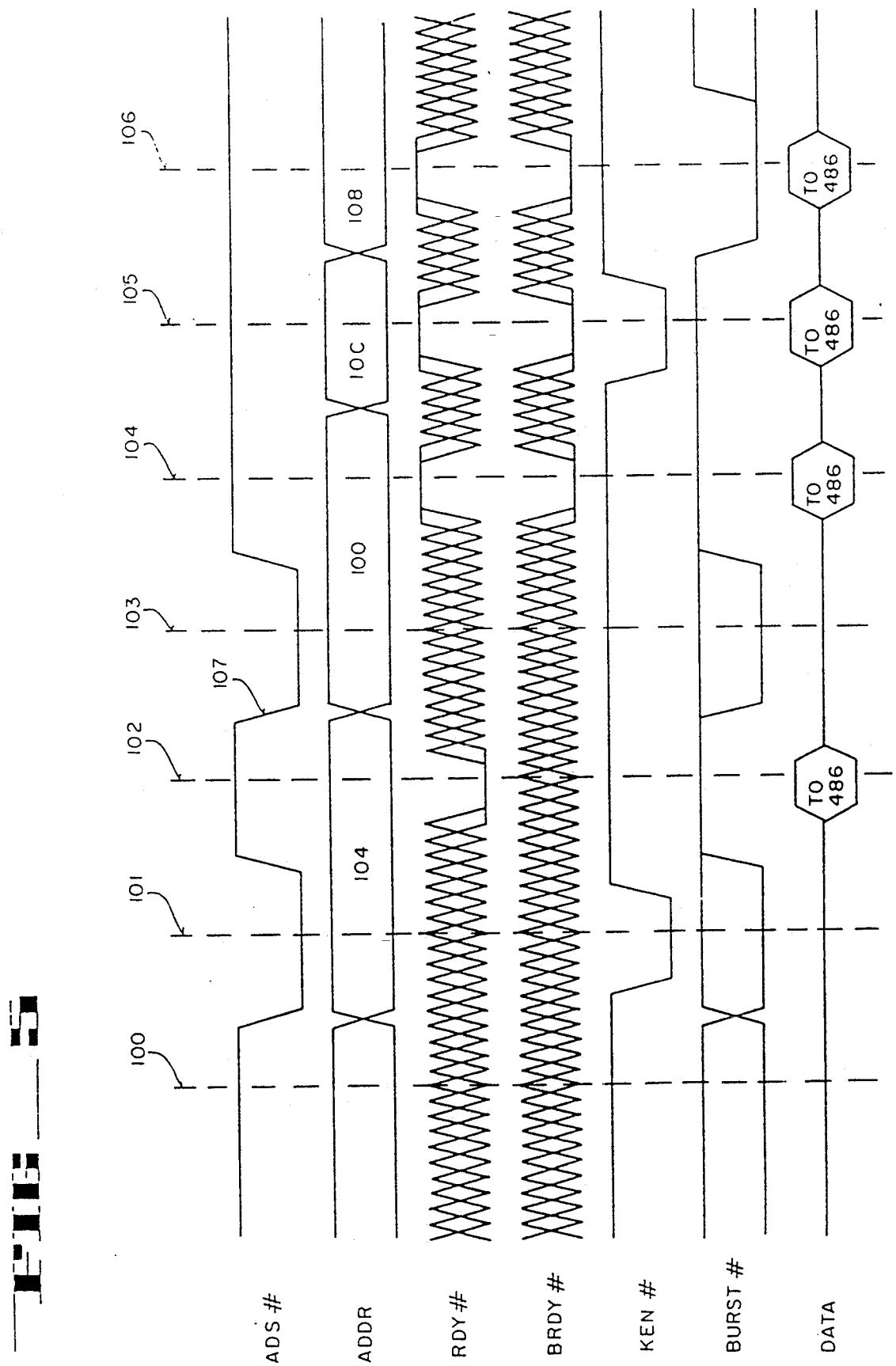

METHOD OF TRANSFERRING BURST DATA IN A MICROPROCESSOR

This is a continuation of application Ser. No. 07/861,602, filed Apr. 1, 1992, now abandoned. which is a continuation of application Ser. No. 07/333,980, filed Apr. 5, 1989, now U.S. Pat. No. 5,131,083.

FIELD OF THE INVENTION

The invention relates to the field of semiconductor microprocessors.

BACKGROUND OF THE INVENTION

The present invention covers a method of burst data transfer incorporated in the bus interfacing unit of a microprocessor known as the Intel 80486® microprocessor, frequently referred to as the 486® processor. The 486 microprocessor is an improved version of the Intel 80386® microprocessor (commonly referred to as the 386® processor) which includes a 32-bit internal data bus; details of the bus for the 386 processor are described in numerous publications. The 386 processor also includes an on-chip memory management unit. This unit provides addressing to, for example, a cache memory, DRAMs, mass storage, etc. The processor described in this application further includes an on-chip cache memory as well as an on-chip floating point unit. (Intel, 80486, 486, 80386 and 386 are trademarks of Intel Corporation.)

For bus requests that require more than a single data cycle, many microprocessors can accept burst cycles instead of normal cycles. A burst cycle transfers multiple bytes of data across the bus during one long memory cycle. For example, a transfer of a 128-bit data item across a 32-bit bus would normally occur in four groups, each group containing 4 bytes. The initial address (e.g., the first byte) is used by the processor to compute the remaining addresses for the subsequent data bytes.

While the concept of burst cycle transfers is well-known in the field, there remains considerable debate over the most efficient way of ordering the transferred data. The burst order refers to the choice of addresses for the sequence of multiple data cycles. One obvious choice employed in the past has been to order the data sequentially starting from zero. For the example given above, a sequential burst order from zero would first transfer the 32-bit doubleword (also called a dword) residing at address zero. The next transfers would be to the dwords at addresses 4, 8 and 12, in order.

Another past approach was to initially transfer the dword that the user wanted to operate on immediately; then increment the address, wrapping around the cache line. This approach is known as the "wrap-around burst (nibble mode)" transfer method. Assuming that the user wants to access dword 3 (dword 3 representing the 32-bit item stored at address 12, e.g., dwords 0-3 corresponding to addresses 0,4,8 and 12, respectively), the received burst order would be 12, 0, 4, 8. In other words, the desired data item is transferred first and the remaining items are transferred in circular sequential order. Whereas the dword residing at address 12 is referenced immediately, the remaining dwords, e.g., 0,4,8, are needed to fill the cache line even though they are not initially referenced.

The wrap-around burst method has an important advantage over the burst from zero method in its ability to first reference the 32-bit dword containing the data referenced by the internal CPU, then completing the burst with the rest of the cache line to fill in the cache. However, a significant drawback is that the wrap-around burst method cannot be used to couple a 32-bit CPU to a 64-bit memory bus in an optimum manner.

The present invention represents an improvement over these prior methods; providing a fast and efficient method of transferring data to an aligned region of main memory. The new burst order permits access to the relevant data first, then filling in the remaining part of the cache line. Importantly, the new burst order supports the connection of a 32-bit CPU to a 64-bit memory bus. In addition to supplying a high-bandwidth transfer for filling cache lines, the burst order of the present invention also has advantages in 486 CPU-based systems, and for use in future systems with wider busses and longer line sizes. These advantages are described later in the application.

Other prior art known to Applicant are the bus signals associated with the Multibus-including the Multibus II (Multibus is a trademark of Intel Corporation). Additionally, other prior art known to applicant is shown in copending application, Ser. No. 006,353, filed Jan. 14, 1987, entitled "High Speed Local Bus and Data Transfer Method", and in copending application, Ser. No. 227,078, filed Aug. 1, 1988, entitled "Microprocessor Bus interface Unit", both of which are assigned to the assignee of the present invention. Further, the following prior art patents are known to applicant: U.S. Pat. Nos. 4,570,220; 4,447,878; 4,442,484; 4,315,308; and, 4,315,310.

SUMMARY OF THE INVENTION

An improved method of burst data transfer between an external memory/bus of line length L and a microprocessor having a data bus of width W (where L and W are measured in bits) is described. The improvement comprises a new burst ordering which permits access to the relevant data item first—filling in the remaining part of the cache line according to a prescribed formula. The series of remaining addresses are generated by EXCLUSIVE-ORing the initial address (i.e., the relevant data item first accessed) with a bit pattern that integrally counts from zero up to the burst length. Prior to EXCLUSIVE-ORing, the bit pattern is shifted left by $LOG_2 (W/8)$ bit positions. Alternatively, the sequence of remaining addresses can be formed by EXCLUSIVE-ORing the initial address with the quantity $(i*(W/8))$, where i again represents a bit pattern which counts form zero up to the burst length (the burst length can be written mathematically as $((L/W)-1)$). One feature of the present invention is that the sequence of addresses of the burst sequence for a line of length L also represents the prefix, or first part, of a new burst sequence starting at the initial address for a line having a length of $L*2^i$. An additional feature allows the user to accommodate different size buses. An example is provided wherein a 32 bit CPU bus is coupled to a 64-bit memory bus.

Other aspects of the present invention are described in the detailed description of the invention.

BRIEF DESCRIPTION OF THE DRAWINGS

The present invention will be understood more fully from the detailed description given below and from the accompanying drawings of the preferred embodiment of the invention, which, however, should not be taken

FIG. 5 illustrates an interrupted burst cycle with a convoluted order of addresses.

DETAILED DESCRIPTION

A method of burst data transfer for a microprocessor is described. In the following description, numerous specific details are set forth, such as specific number of bytes, etc., in order to provide a thorough understanding of the preferred embodiment of the present invention. It will be obvious, however, to one skilled in the art that the present invention may be practiced without these specific details. In other instances, well-known circuits have not been shown in detail in order not to unnecessarily obscure the present invention.

OVERALL BLOCK DIAGRAM OF THE MICROPROCESSOR

Figure 1:
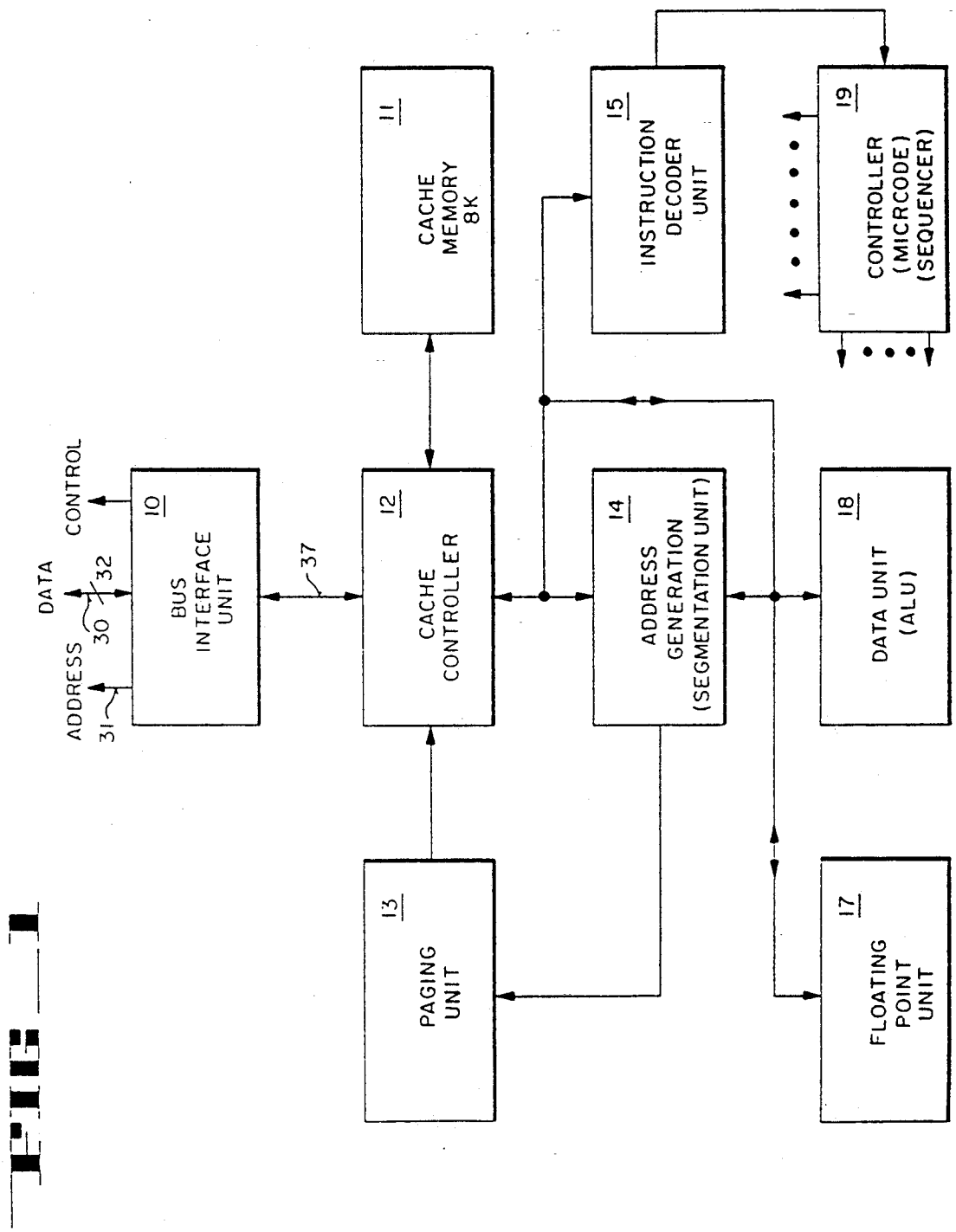
FIG. 1 is a general block diagram showing the various units that make up the microprocessor.

Referring to FIG. 1, the microprocessor incorporating the bus transfer method of the present invention is shown in general block diagram form. The microprocessor includes a bus interface unit 10 which is coupled to a 32-bit external data bus 30, and additionally is coupled to an address bus 31 and several other control lines as will be described in conjunction with FIG. 2. (Note the term "data" is generally used to indicate information transferred over the data bus. This information may include instructions, constants, pointers, etc.) The interface unit 10 is coupled by address and data buses to a cache memory controller 12. Controller 12 controls the accessing of the cache memory 11. The controller 12 is coupled to the address generation unit 14; a paging unit 13 is also coupled between the address generation unit 14 and cache controller 12 via bus 37. For purposes of understanding the present invention, the address generation unit may be assumed to be the same as that used in the commercially available Intel 80386. The segmentation and paging units for the Intel 80386 are described in copending application, Ser. No. 744,389, filed Jun. 13, 1985, entitled "Memory Management For Microprocessor", which is assigned to the assignee of the present invention.

For purposes of understanding the present invention, the specific configuration of a cache memory 11 and cache controller 12 are not important. Signal flow between the controller 12 and interface unit 10 insofar as needed to understand the present invention are described in conjunction with FIG. 2.

Within the microprocessor instructions are coupled to the instruction decoder unit 15. The decoder unit operates with a controller 19 in which microcode instructions are stored; the controller 19 provides sequences of control signals for the microprocessor. The instruction decoder unit 15 is shown coupled to controller 19; the outputs from the controller are coupled to all the other units of the microprocessor. The data unit 18 is an arithmetic logic unit (ALU) which performs ALU functions in a similar manner to those performed by the Intel 80386.

The microprocessor also includes a floating point unit 17 for performing floating point computations. The precise configuration of the unit 17 is not critical to the present invention although the block transfers required by the unit 17 and the cache memory 11 provided some of the impetus for the present invention.

The currently preferred embodiment of the microprocessor of FIG. 1 is realizable with known metal-oxide-semiconductor (MOS) technology and, in particular, with complementary MOS (CMOS) technology. Clock rates of 25 MHz or better are possible with current CMOS technology.

BLOCK DIAGRAM OF BUS INTERFACE UNIT

Figure 2:
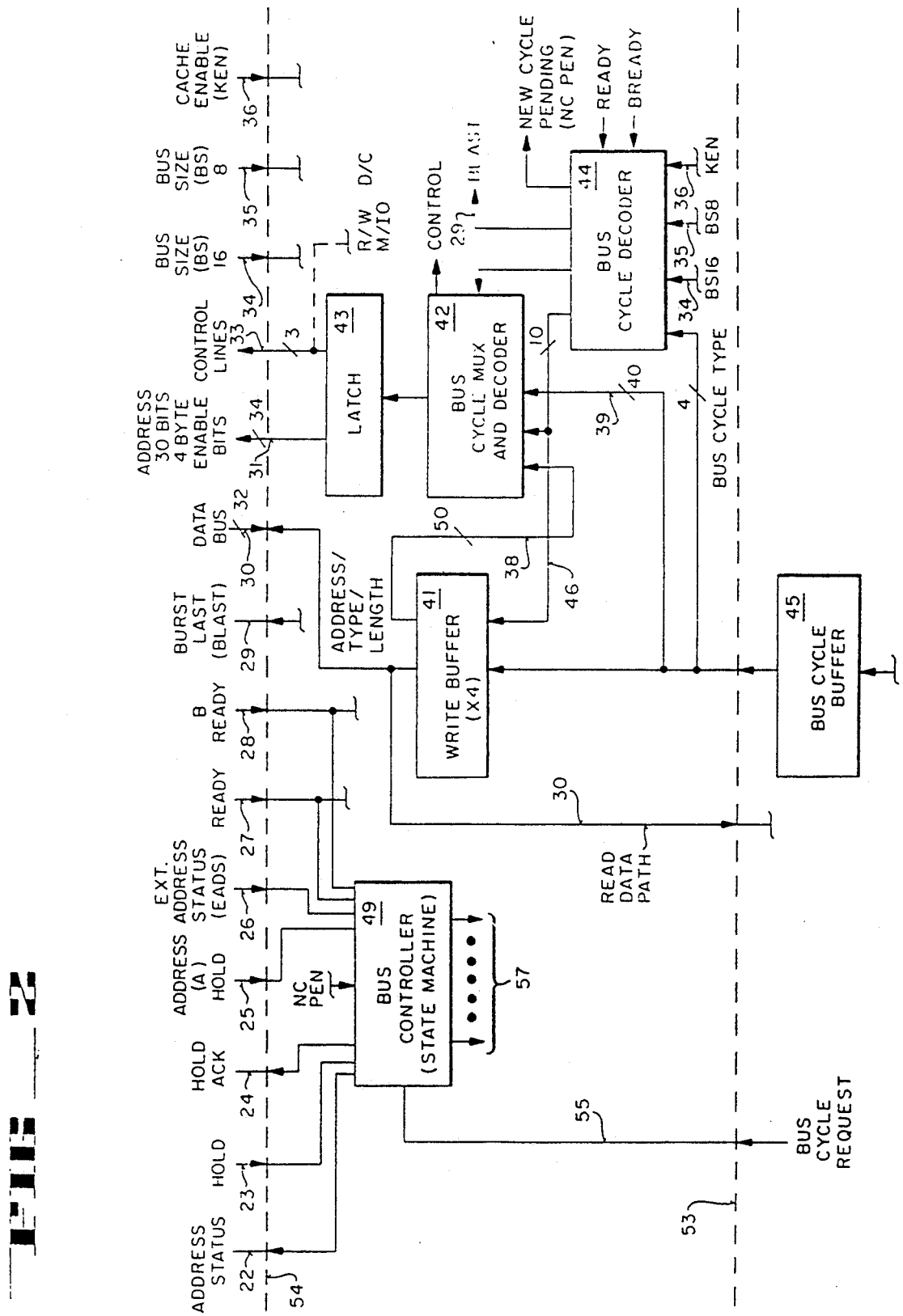
FIG. 2 is a block diagram of the bus interface unit of the microprocessor.

The major components of the bus interface unit 10 of FIG. 1 are shown in FIG. 2 between the dotted lines 53 and 54. The cache controller 12 communicates with the interface unit 10 through the bus cycle buffer 45. All memory addresses, various control signals and all data to be entered into external memory are communicated to unit 10 through the buffer 45. Incoming data (read data path) is communicated directly to the cache controller 12 through the interface unit 10.

The output data of buffer 45 is coupled to the write buffer 41. This buffer is "4 deep", thus permitting data from buffer 45 for four CPU cycles to be temporarily stored in one of the four stages of the buffer 41. The output of the buffer 41 communicates directly with the data bus 30. Also stored in buffer 41 and associated with data stored in each of the four stages are signals representing the memory address, memory cycle type and length. The signals representing bus cycle type, etc., are coupled from the decoder 44 via lines 46 to the buffer 41 and to the bus cycle multiplexer and decoder 42.

The bus cycle multiplexer and decoder 42 selects either the address signals, bus type signals, etc., (i) from the buffer 41 (lines 38) or, (ii) directly from the buffer 45 (lines 39) and lines 46. The output of multiplexer and decoder 42 is coupled to the latch 43. The output of the latch provides the address signals (30 bits of address and 4 bits (byte enable signals)) on bus 31 and control lines for the memory on lines 33.

Four bits from the buffer 45 are coupled to the bus cycle decoder 44 to indicate the type of bus cycle. These bits indicate up to 16 different types of bus cycles, such as memory read, memory write, I/O read/write, prefetch, branch, locked read, locked write, write not finished, in-circuit emulator (read or write), and read and write to paging unit 13. The bus cycle type bits are decoded in decoder 44 and used to control, for example, the multiplexer 42, and to provide certain outputs such as the "blast" signal which shall be discussed.

The bus controller 49 receives a bus cycle request signal on line 55 in addition to several other inputs which shall be described. The bus controller provides control signals on lines 57 to the various circuits in the bus interface unit 10 including the bus cycle decoder 44, bus cycle multiplexer and decoder 42, latch 43 and buffer 41. The bus controller operates as an ordinary state machine.

The bus cycle decoder 44 provides the blast signal (burst last, sometimes referred to as the last signal). This signal (active low) indicates that a microprocessor data request (input or output) will be satisfied at the next ready signal on lines 27 or 28.

INPUTS TO AND OUTPUTS FROM THE BUS INTERFACE UNIT 10

The major external inputs to the bus interface unit and the major outputs (to external circuitry) from the unit 10 are shown in FIG. 2 along line 54. The data bus 30 is a 32-bit bidirectional bus. All 32 lines of this bus typically require a connection to external circuitry. The microprocessor provides a memory address on the address bus 31. This address consists of 30 bits of address signals and four byte enable bits. The three memory control lines 33 indicate read/write to memory, input/output and data vs. control (for example, prefetch from memory vs. data read). The address status (ADS) is an active low signal on line 22 indicating that the address on bus 31 is valid.

The memory cycle requests by the microprocessor generally require 32 bits of data read from memory or written to memory (larger transfers such as those associated with a cache memory are discussed later). In some cases, the memory may be limited to an 8-bit or 16-bit bus. If this is the case, the memory provides an appropriate signal on lines 34 or 35. The signal on line 35 (bus size 8) indicates that the transfer will be satisfied with eight bit transfers whereas the signal on line 34 (bus size 16) indicates that the request will be satisfied with 16 bit transfers. Lines 34 and 35 are coupled to the bus cycle decoder 44 and their use particularly for the generation of the blast signal on line 29 shall be discussed later in the application.

As mentioned, the microprocessor includes an on-chip cache memory. Certain data is designated for storage within the cache memory. External circuitry examines addresses from the microprocessor and determines if a particular address falls within address space designated for storage within the cache memory. This is generally done for instructions, constants, etc., and not done for data which is shared. If external circuitry determines that the data requested is "cacheable" that is, it should be stored in the cache memory, then the KEN signal is returned (active low) on line 36. This signal is coupled to the decoder 44 and is used in generating the blast signal.

The input on line 23 is an ordinary "hold" signal and the output on line 24 is a hold acknowledge. The input signal on line 25 (address hold) indicates that the external bus is to be immediately floated. This is done to prevent system deadlock with other equipment on the bus. Line 26 provides an external address status. Lines 27 and 28 receive a ready signal and a "burst" ready signal, respectively. These signals are also coupled to the bus cycle decoder 44.

BURST ORDERING

For bus requests that require more than a single data cycle, the invented microprocessor can accept burst cycles instead of normal cycles. In these, a new data item is strobed into the 80486 processor every clock, instead of the maximum every other clock provided by non-burst cycles. In addition, the addresses of the data items in burst cycles all fall within the same 16-byte aligned area (corresponding to an internal 80486 cache line), and the address of subsequent transfers can easily be calculated in advance by external hardware given the current address. These combine to allow devising an external memory system that can quickly fill a 486 internal cache line. As previously stated, the present invention allows a programmer to retrieve a data item needed by the current instruction as fast as possible, i.e., as the first part a burst transfer. Remaining data items in the cache line are retrieved in a manner which is optimum for any bus width less than the cache line length.

In systems based on the 80486 CPU, a memory system must be built with two interleaved 32-bit banks of memory that are multiplexed down to the single 32-bit data bus in order to meet the 1-clock burst timing for maximum bus bandwidth. This means that the memory system is actually a 64-bit memory that is multiplexed down to transfer into the 80486 CPU data pins. The burst order of the present invention is optimized for this configuration in that it will transfer both parts of a 64-bit neighborhood of memory (the relevant dwords from both 32-bit memory banks) before accessing the next 64-bit neighborhood.

This ease of connecting a 32-bit CPU to a 64-bit memory/bus generalizes in two dimensions. First, it permits connection of a CPU with bus width=W to any memory/bus that is of width=$(2^n)$ * W, where n is an integer. The above example illustrates this phenomena where W=32 and n=1. Secondly, it permits connection of a CPU with line size=L to a memory/bus with line size=$(2^m)$ * W, where m again is a (possibly different) integer.

The burst order of the present invention also supports disparate line lengths since, given a fixed bus width (e.g. 32 or 64-bits), the burst sequence for a line of a given length is always the first part of the burst sequence for any longer line length (assume line sizes are power of 2).

By way of example, the burst order for referencing an address that is 24 mod 32 (e.g., 24, 56, 88, . . . ) on a 32-bit will generate the sequences of addresses for a 16-byte line and a 32-byte line (the continuation for the 32-byte line is shown in brackets). The top line shows the decimal address (modulo 32) while the bottom line shows the address in binary form.

24, 28, 16, 20, [8, 12, 0, 4]
11000, 11100, 10000, 10100, [01000, 011100, 00000, 00100]

A similar example is the reference to 4 mod 32:

4, 0, 12, 8, [20, 16, 28, 24]
00100, 00000, 01100, 01000 [10100, 10000, 11100, 11000]

From these examples, a mathematical formulation of the burst address generation as a function can be derived as a function of the line L and bus width W.

$$A_i = A_0 \oplus (i << LOG_2(W/8)$$

where i=0, 1, . . . (L/W)−1

As can be seen from the above equation, the series or sequence of addresses is formed by EXCLUSIVE-ORing the original address $A_0$ with a bit pattern that counts from zero up to the burst length (=(L/W)−1). Prior to the EXCLUSIVE-OR operation (i.e., $\oplus$) the bit pattern is shifted left (i.e., "<<") by an amount equal to $LOG_2(W/8)$, where W and L are measured in bits, not bytes and addresses are byte addresses. Also, it is appreciated that the divisor "8" in the above formula is based on the use of byte addressing. If, instead of bytes, words are addressed by the processor, then an alternative divisor should be substituted (e.g., "16"). In the last example, W=32 and L=128, so that the sequence of addresses was formed by EXCLUSIVE-ORing $A_0$ with the sequence running from 0 to 3 [or 7], shifted left (i.e., "<<") by $LOG_2 (4)=2$:

00000, 00100, 01000, 01100, [10000, 10100, 11000, 11000]

Alternatively, the same burst ordering may be achieved through the following algorithm:

$$A_i = A_0 \oplus (i*(W/8))$$

Using this algorithm the initial address referenced (e.g., $A_0$) is EXCLUSIVE-ORed with the product of the bit pattern sequence (e.g., i=0, 1, ... (L/W)−1) and the quantity (W/8). It is appreciated that both algorithms achieve identical burst sequences. From these formulations it is obvious that for a given bus width W, the sequence of addresses for bursting a line of length L is the prefix of the sequence of addresses for bursting a line of length=$L*2^i$. Thus, the present invention has the property of allowing the user to mix and match different line sizes. Instead of having a fixed 128-bits, the programmer can work in a system that has 128, 256, 512, 1024, etc., bit lines and data transfer along the bus still works smoothly. This is because the burst order for a short line is the prefix of the burst order of a longer line as previously discussed. The ability to mix and match different line sizes is extremely important since there is no fixed standard for memory/bus line size in the microprocessor field.

To show that this burst sequence smoothly couples memory/buses of different widths, we must expand the formula to identify the addresses transferred in a single cycle. For this, the notation of a sequence of bytes per transfer is used. This "range expansion" takes place in the bits "shifted over" by the previous notation, since they both correspond to the bus width. The range is indicated by the notation LowAddr . . . HighAddr, where LowAddr is the address of the first byte in the transfer, and HighAddr is the address of the last byte in the transfer, with all bytes between LowAddr and HighAddr participating in the transfer. In the case of a 32-bit bus, this would be denoted as the range bbb00 . . . bbb11 transferred by a single data cycle on a 32-bit bus. Using the previous example of a 32-bit bus and a 128-bit [256-bit] line, the following sequences arise:

00000 . . . 00011, 00100 . . . 00111, 01000 . . . 01011,
01100 . . . 01111, [10000 . . . 10011, 10100 . . . 10111,
11000 . . . 11011, 11100 . . . 11111]

Using a 64-bit bus and a 128-bit [256 bit] line we get the sequence:

00000 . . . 00111, 01000 . . . 01111,
[10000 . . . 10111, 11000 . . . 11111]

This issustrates the key advantage of this new method of bursting data in a microprocessor system; namely, the method naturally accommodates mixtures of line lengths and bus sizes. Different line lengths are easily accommodated since the burst sequence starting from any address $A_0$ for a given line length L is the prefix (i.e., first part) of the burst sequence for the sequence starting at the same address for any line length that is a power of $2*L(=L*2^i)$.

As illustrated in the last example, different bus widths are easily coupled, since the sequence for a narrow bus encompasses the data range transferred by a wider bus. A bus of width W uses the first four cycles to pick up the range of data in a bus of width 4W, and a bus of width 2W uses two cycles to pick up the same data where each cycle of the 2W bus picks up data in one cycle that the bus of width W picks up in two cycles.

BURST CYCLES

The implementation of burst cycles using the burst ordering method described above is via the burst ready (BRDY#) pin. (The # is used to indicate that the signal is active low). This pin indicates a burst ready to the invented microprocessor. For all cycles that cannot be bursted, e.g., interrupted acknowledge and halt, this pin has the same affect on the 80486 as the normal ready (RDY#) pin. When returned in response to a burstable cycle, the microprocessor expects that the external memory system is performing a burst transfer. If both BRDY# and RDY# are returned in the same clock BRDY# is ignored.

The fastest burst cycle possible requires two clocks for the first data item to be returned to the processor with subsequent data items returned every clock. Burst cycles need not return data on every clock. The microprocessor will only strobe data into the chip when either RDY# or BRDY# are active. Thus, BRDY# need not be generated every clock for burst operations. During each part of the burst transfer, the BLAST# pin indicates whether the burst will end on the next ready. The microprocessor drives BLAST# inactive in the clock BRDY# is returned to indicate more data cycles are necessary to complete the burst. If BLAST# is driven active in the clock that BRDY# is returned, the burst transfer has completed, and the microprocessor will either drive out a new bus cycle, or the bus will go idle. Since the BLAST# output is a function of the cache enable (KEN#) pin and the bus sizing pins BS8# and BS16# inputs sampled in the previous clock, BLAST# is not valid in the first clock of a bus cycle, and is sampled only in the second and subsequent clocks when RDY# or BRDY# is returned.

When initiating any read or prefetch, the invented microprocessor presents the address for the data requested. As described above, when the 80486 processor converts a cycle into a cache fill, the first data item return should correspond to the address sent out by the microprocessor with the exception that all byte enables should be taken as being active. This remains true whether the external system responds with the sequence of normal bus cycles or with a burst cycle.

Figure 3:
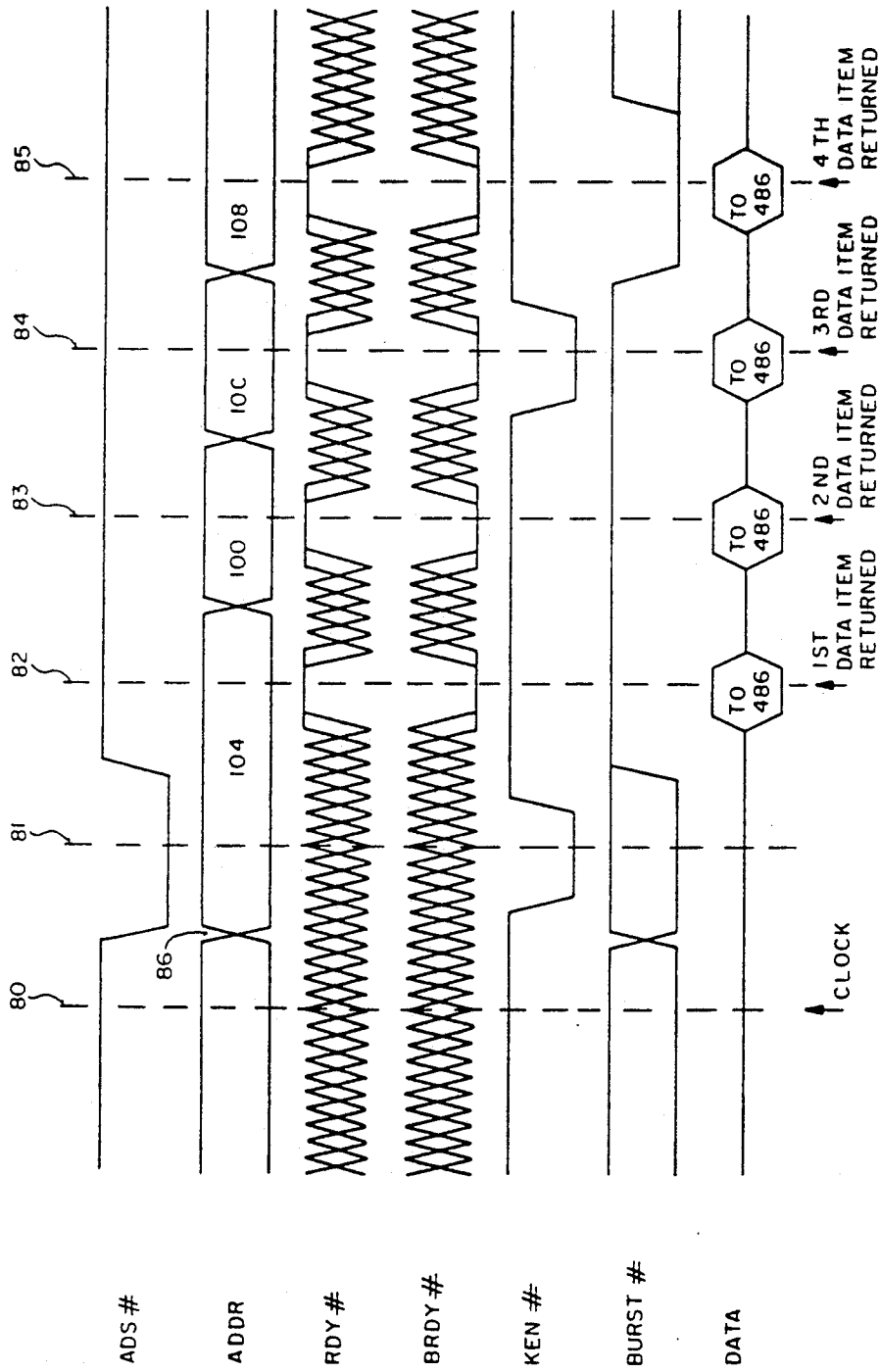
FIG. 3 illustrates waveforms for a basic burst cycle showing the order of the addresses.

An example of the ordering of burst addresses as described in the previous section is shown in FIG. 3. The vertical lines 80 through 85 represent the times at which internal clocking signals occur (e.g., 25 MHz). The waveform for ADS# indicates that after time 80 the microprocessor provides a signal on line 22 indicating that a new address is present on address bus 31. The address signals are shown with the new address signals becoming valid as indicated by the transition 86.

Note that in the case of FIG. 3 the cache enable pin (KEN#) is bought active low at time 81 before the first BRDY#. This has the affect of transforming the external data cycle into a multiple data cycle cache fill. If wait states occur, the microprocessor permits KEN# to change state many times before the first ready (either RDY# or BRDY#) so long as it settles down before the clock before the first ready.

Data from the initial address, $A_0$ is strobed into the microprocessor at time 82 when BRDY# is active low. The BRDY# pin indicates that the external system has presented valid data on the data pins in response to a read or that the external system has accepted the microprocessor data in response to a write request. The other data items used to fill the cache are transferred at times 83, 84, and 85. The burst order used to transfer the data in the microprocessor is shown below in Table 1. For example, if the first address was 104, the next three addresses in the burst will be 100, 10C, and 108 (using hexidecimal notation).

TABLE 1

| First Address | Second Address | Third Address | Fourth Address |
|---|---|---|---|
| 0 | 4 | 8 | C |
| 4 | 0 | C | 8 |
| 8 | C | 0 | 4 |
| C | 8 | 4 | 0 |

The sequences shown in table 1 accommodates systems with 64-bit buses as well as systems with 32-bit buses. The sequence applies to all bursts, regardless of whether the purpose of the burst is to fill a cache line, do a 64-bit read, or do a prefetch. Furthermore, if BS8#/BS16# is returned, the microprocessor first completes the transfer of the current dword before progressing to the next dword. Thus, a BS16# burst to address 4 has the following order: 4-6-0-2-C-E-8-A.

Some memory systems may not be able to respond with burst cycles in the order defined by Table 1. To support such systems, the invented microprocessor allows a burst cycle to be interrupted at any time. In this case, the microprocessor will automatically generate another normal bus cycle (to which the external system could respond with another burst cycle) to complete data transfer. This is called an interrupted burst cycle. An example of such a cycle is shown in FIG. 4.

Figure 4:
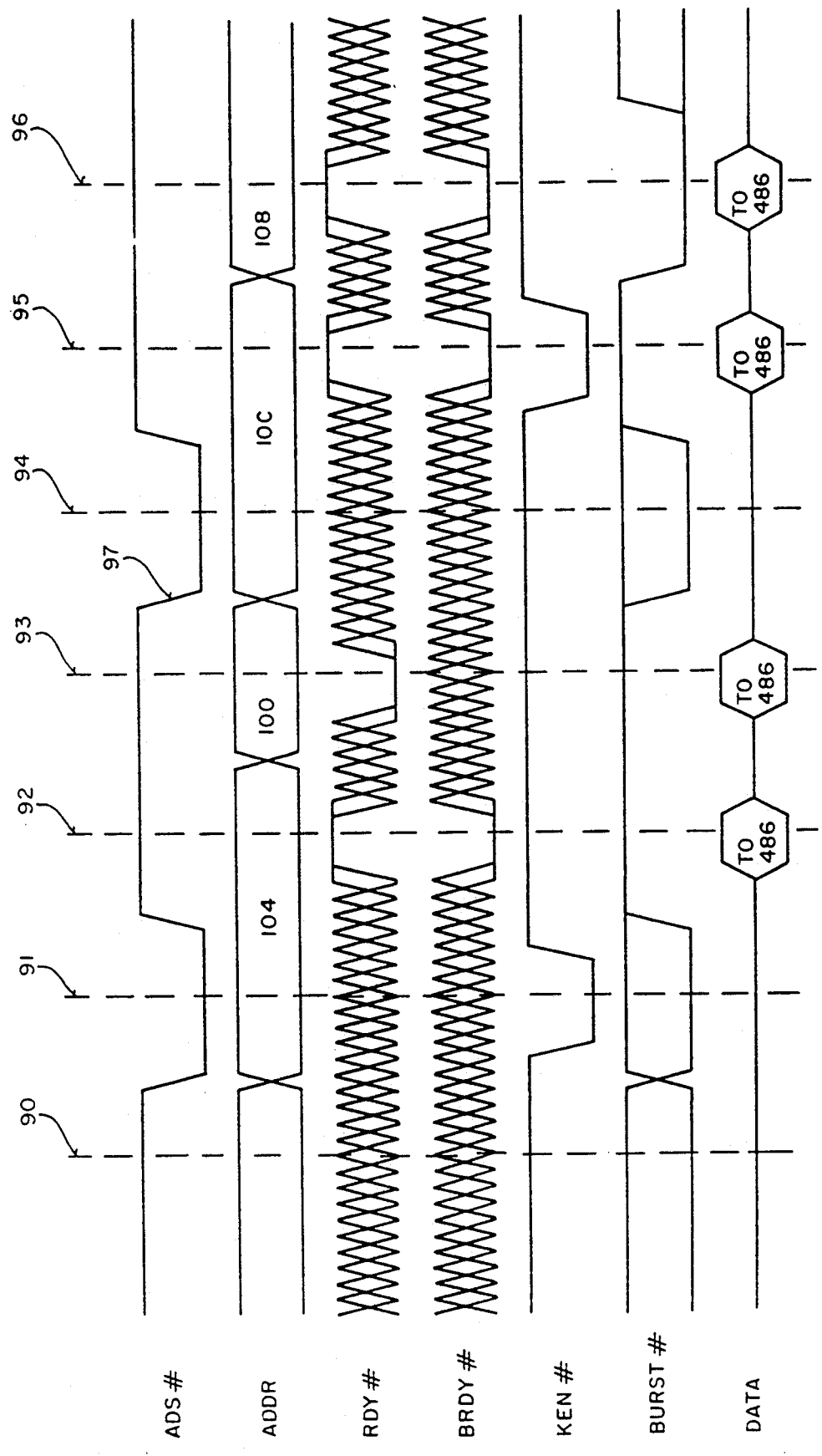
FIG. 4 illustrates waveforms for an interrupted burst cycle.

Referring to FIG. 4 to signal an interrupted burst cycle to the microprocessor, the system need merely return RDY# instead of BRDY#. This is shown at time 93 where RDY# is active low and BRDY# is not return valid. Note that after RDY# is returned to the microprocessor that it immediately generates another ADS# initiated bus cycle, since BLAST# indicates that the data transfer is not yet been completed. Note that KEN# need not be returned active for the first data cycle of the second part of the transfer. This is because the cycle had already been converted to a cache fill by the first cycle generated by the microprocessor. Also note that in this example and in FIG. 4 the first half and the second half of the transfer are themselves burst transfers—each two data cycles long. One consequence of interrupting burst transfers is that it makes predicting the next address somewhat convoluted.

An example of a convoluted order is shown in FIG. 5. During the cache line fill, if the microprocessor requests address 104 and the system returns RDY# (as shown occurring at time 102 in FIG. 5), the microprocessor will drive out a new request (by asserting ADS#) to address 100. ADS# is reasserted at transition 107. If the system returns BRDY#, the microprocessor will next request/expect address 10C. Thus, the correct order is determined by the first cycle in the transfer in accordance with the discussion regarding burst ordering. This may not be the first cycle in the burst if the system mixes RDY# with BRDY#. External hardware can distinguish the first cycle in a transfer by noting the state of BLAST# during the previous cycle. Of course, this is necessary only if external hardware wishes to mix RDY with BRDY and generate its own burst addresses, since the processor always supplies the correct address for all parts for burst.

Burst cycles can also be returned as 8 or 16-bit cycles if BS8# or BS16# are active. In this case, the burst cycle would stretch to 16 data cycles long. The sequencing of addresses is the same as if burst cycles are not returned and the data is expected by the microprocessor on the same data lines as if the data were not being returned in a burst cycle. Also, not that a single 32-bit noncacheable microprocessor read could be read into the microprocessor as four 8-bit burst data cycles. Similarly, a single 32-bit 486 write could be written as four 8-bit burst data cycles. (Burst writes can only occur if BS8# or BS16# is asserted).

Thus, a new method of bursting data has been described.

What is claimed is:

1. A microprocessor system including a microprocessor and an external memory device, said microprocessor having an internal bus of width W bits coupled to an external bus accomodating transfer of a data line of length L bits, said data line including a plurality of data items, said microprocessor system being adapted to transfer said plurality of data items in a burst format from said external memory device via said external bus to said internal bus, said microprocessor system comprising:

an address generator for generating a first address, $A_0$, for accessing in said external memory device a first data item of said data line;

an address sequence generator for generating a sequence of remaining addresses for accessing remaining ones of said data items of said data line, wherein said sequence of remaining addresses is generated according to $$A_i = A_0 \oplus (i*(W/8)),$$

where $A_i$ represents one of said remaining addresses in said sequence and wherein i=1, 2, ... ((L/W)−1) and L and W are integers;

wherein said external memory device transfers to said microprocessor said first data item corresponding to said first address, $A_0$, and wherein said external memory device transfers to said microprocessor in a burst format said remaining ones of said data items in an order corresponding to said sequence of remaining addresses.

2. A microprocessor system according to claim 1, wherein said microprocessor includes an internal cache having a line length of L bits, and wherein a line of said internal cache is filled using said first address and said sequence of remaining addresses.

3. A microprocessor system according to claim 1, wherein said address sequence generator is external to said microprocessor.

4. A microprocessor system according to claim 1, wherein said sequence of remaining addresses is generated in said external memory device.

5. A microprocessor system according to claim 1, wherein said sequence of remaining addresses represents a prefix of a burst sequence starting at said first address for a line of length $L*2^i$, where i is an integer.

6. A method for operating a microprocessor, said microprocessor having an internal bus of width W bits coupled to an external bus accomodating transfer of a data line of length L bits, said data line including a plurality of data items, said method including transferring said plurality of data items in burst format from said external bus to said internal bus, and comprising the steps of:

issuing a first address, $A_O$, by said microprocessor to access a first data item of said data line;

generating a sequence of remaining addresses representing remaining ones of said data items of said data line other than said first data item, wherein said sequence of remaining addresses is generated according to $$A_i = A_O \oplus (i*(W/8)),$$

where $A_i$ represents one of said remaining addresses in said sequence and wherein $i=1,2,\ldots ((L/W)-1)$ and L and W are integers; and receiving on said internal bus from said external bus said first data item and said remaining one of said data items.

7. The method of claim 6 wherein said sequence of remaining addresses represents a prefix of a burst sequence starting at said first address for a line of length $L*2^i$, where i is an integer.

8. The method of claim 6 wherein said microprocessor includes an internal cache having a line length of L bits, and further comprising the steps of:

filling a line of said internal cache with data transferred using said sequence of remaining addresses.

9. The method according to claim 6 wherein said step of generating said remaining addresses is performed in an address generator external to said microprocessor.

10. A device for transferring L bits of data as a plurality of data items in burst format to a microprocessor having an internal data bus of width W bits via an external data bus in response to a first address signal, $A_O$, wherein said first address signal corresponds to a first data item, the device comprising:

circuitry for generating a sequence of remaining addresses representing remaining ones of said data items other than said first data item, wherein said sequence of remaining addresses is generated according to $A_i = A_O \oplus (i* (W/8))$, where $A_i$ represents one of said remaining addresses in said sequence and wherein $i=1,2,\ldots ((L/W)-1)$ and L and W are integers; and circuitry for receiving said first address signal and said remaining addresses and providing the first data item and said remaining ones of said data items to said external bus.

* * * * *

UNITED STATES PATENT AND TRADEMARK OFFICE
CERTIFICATE OF CORRECTION

PATENT NO. : 5,255,378
DATED : October 19, 1993
INVENTOR(S) : Crawford et al.

It is certified that error appears in the above-identified patent and that said Letters Patent is hereby corrected as shown below:

In column 1 at line 51 insert --that-- following "in" and before "order"

In column 6 at line 51 insert --length-- following "line" and before "L"

In column 7 at line 6 delete "11000" and insert --11100--

In column 7 at line 60 delete "issustrates" and insert --illustrates--

Signed and Sealed this

Tenth Day of September, 1996

Attest:

BRUCE LEHMAN

*Attesting Officer*    *Commissioner of Patents and Trademarks*